United States Patent [19]

Onizawa

[11] 4,289,861
[45] Sep. 15, 1981

[54] CURABLE RUBBER COMPOSITIONS WITH AMINO ACIDS

[75] Inventor: Masao Onizawa, Ohmiya, Japan

[73] Assignee: Sanyo Trading Co., Ltd., Japan

[21] Appl. No.: 749,081

[22] Filed: Dec. 9, 1976

[30] Foreign Application Priority Data

Dec. 27, 1975 [JP] Japan .............................. 50-155874
Apr. 23, 1976 [JP] Japan .............................. 51-45438
May 12, 1976 [JP] Japan .............................. 51-53338

[51] Int. Cl.³ ............................................ C08C 19/22
[52] U.S. Cl. .................................... 525/346; 525/50; 525/347
[58] Field of Search ............ 260/79.5 B, 783, 23.7 M; 526/30; 525/346, 347

[56] References Cited

U.S. PATENT DOCUMENTS

1,477,805 12/1923 Bedford .............................. 260/783
1,779,846 10/1930 Jacobsohn .......................... 260/740

FOREIGN PATENT DOCUMENTS

279271 2/1911 Fed. Rep. of Germany ...... 260/783
1350764 12/1963 France .............................. 260/79.5
650793 3/1951 United Kingdom ................ 260/740

OTHER PUBLICATIONS

Chem. Abst., 66, 19572x (abstract of Spanish Pat. 308175 (7-65)).

*Primary Examiner*—C. A. Henderson
*Attorney, Agent, or Firm*—Wenderoth, Lind & Ponack

[57] ABSTRACT

A curable composition consisting essentially of (A) at least one rubber selected from the group consisting of a styrene-butadiene rubber, an acrylonitrile-butadiene rubber, a polybutadiene rubber, an acrylonitrile-isoprene rubber, an alfin rubber, a butadiene-methyl methacrylate rubber, a polyisoprene rubber, an acrylonitrile-butadiene-isoprene rubber, a carboxylated acrylonitrile-butadiene rubber, a propylene oxide rubber, a propylene-butadiene rubber, and natural rubber, (B) at least one curing agent selected from the group consisting of sulfur and sulfur donors, and (C) at least one compound, as a vulcanization accelerator not requiring an activator, selected from the group consisting of arginine, lysine, hydroxy-lysine, ornithine, proline, hydroxyproline, leucine, isoleucine, histidine, tryptophan, threonine, serine, homoserine, alanine, phenylalanine, valine, methionine, citrulline, tyrosine, asparagine, aspartic acid, glutamine, glutamic acid, and salts of these amino acids.

4 Claims, 11 Drawing Figures

CURABLE RUBBER COMPOSITIONS WITH AMINO ACIDS

FIELD OF THE INVENTION

This invention relates to a novel and superior vulcanization accelerator for use in vulcanizing a variety of rubbers, such as a styrene-butadiene rubber (SBR), an acrylonitrile-butadiene rubber (NBR), a polybutadiene rubber (BR), an acrylonitrile-isoprene rubber (NIR), an alfin rubber (AR), a butadiene-methyl methacrylate rubber (MBR), a polyisoprene rubber (IR), an acrylonitrile-butadiene-isoprene rubber (NBIR), a carboxylated acrylonitrile-butadiene rubber (CNBR), a propylene oxide rubber (POR), a propylene-butadiene rubber (PBR), or natural rubber (NR), with sulfur and/or a sulfur donor.

BACKGROUND OF THE INVENTION

The rubbers mentioned above are very commonly used now in the rubber industry, and these rubbers are all cured with sulfur as a main curing agent. Where it is desired to improve the thermal resistance and aging resistance of vulcanized rubbers, the use of a sulfur donor as a curing agent is recommended. In many cases, the sulfur donor is used in combination with sulfur.

It has previously been believed that in sulfur vulcanization, the use of curing accelerators and activators together with sulfur is essential. The vulcanization accelerator is a substance which when used in small amounts, can increase the rate of vulcanization and decrease the temperature and time necessary for vulcanization. The accelerator produces other beneficial results such as the improvement of the physical properties of vulcanized rubbers, such as tensile strength or modulus, the preventation of blooming, or the improvement of their aging resistance. The activators, on the other hand, are substances which when used together with vulcanization accelerators, enable the vulcanization accelerators to exhibit their activities effectively, and affect the rate of vulcanization and the physical properties and aging characteristics of rubber. Vulcanization with sulfur alone without accelerators is scarcely acceptable for commercial operation because the rate of vulcanization is slow, and the resulting vulcanized rubbers have poor physical properties. Conventional accelerators, however, must be used together with activators in order to exhibit satisfactory accelerating effects, and in the absence of activators, the results are extremely unsatisfactory. For this reason, it has been believed in the rubber industry that sulfur, accelerators and activators are the three essential elements for vulcanizing rubbers.

Typical examples of the vulcanization accelerators which have been used in the art are guanidines such as diphenyl guanidine, aldehyde-amines such as a condensation product of n-butyraldehyde and butylidene aniline, aldehyde-ammonias such as hexamethylene tetramine and acetaldehyde ammonia, thiazoles such as 2-mercapto-benzothiazole, sulfenamides such as benzothiazyl-2-diethyl sulfenamide and N-cyclohexyl-2-benzothiazyl sulfenamide, thiurams such as tetramethylthiuram disulfide and dipentamethylenethiuram hexasulfide, dithiocarbamates such as sodium dimethyl dithiocarbamate and zinc dimethyl dithiocarbamate, and xanthates such as sodium isopropyl xanthate. All of these accelerators must be used in conjunction with activators (mainly zinc oxide). Some of these conventional accelerators have known or suspected toxicity, and from the standpoint of controlling environmental pollution, the development of accelerators not injurious to man's health and having a high degree of safety has been desired.

Among the conventional activators are zinc oxide, litharge, magnesium oxide, organic amines, alkali carbonates, and alkali hydroxides. Of these, zinc oxide is the best activator and gains almost exclusive acceptance in the rubber industry. The zinc oxide, however, is liable to scatter as dust, and its use is undesirable for the health of the working personnel. Zinc oxide added as an activator also remains in the final vulcanized rubber product, and dissolves out in service. Accordingly, the use of zinc oxide is especially undesirable where the vulcanized products are used in applications associated with medical therapy and foodstuffs (for example, as bottle stoppers, nipples or nursing bottles, or cap liners). It is very desirable therefore to develop accelerators which do not require the conjoint use of activators typified by zinc oxide.

It is well known on the other hand that when the sulfur donor is used as a curing agent either alone or in combination with sulfur, the conjoint use of zinc oxide is essential. Accordingly, the same hygienic problem exists in this case.

It has now been found that specified amino acids exhibit very good vulcanization accelerating effects when vulcanizing the aforementioned rubbers with sulfur and/or a sulfur donor, and surprisingly, the use of the amino acids quite obviates the conjoint use of activators which is essential in the case of conventional vulcanization accelerators.

SUMMARY OF THE INVENTION

This invention relates to a vulcanizable composition comprising (A) at least one rubber selected from the group consisting of a styrene-butadiene rubber (SBR), an acrylonitrile-butadiene rubber (NBR), a polybutadiene rubber (BR), an acrylonitrile-isoprene rubber (NIR), an alfin rubber (AR), a butadiene-methyl methacrylate rubber (MBR), a polyisoprene rubber (IR), an acrylonitrile-butadiene-isoprene rubber (NBIR), a carboxylated acrylonitrile-butadiene rubber (CNBR), a propylene oxide rubber (POR), a propylene-butadiene rubber (PBR) and natural rubber (NR), (B) a curing agent composed of sulfur and/or a sulfur donor, and (C) at least one compound selected from the group consisting of arginine, lysine, hydroxylysine, ornithine, proline, hydroxyproline, leucine, isoleucine, histidine, tryptophan, threonine, serine, homoserine, alanine, phenylalanine, valine, methionine, citrulline, tyrosine, asparagine, aspartic acid, glutamine, glutamic acid, and salts of these amino acids.

DETAILED DESCRIPTION OF THE INVENTION

The various rubbers used as a first component of the composition of this invention are all known. Specifically, the styrene-butadiene rubber (SBR) is a synthetic rubber obtained by copolymerizing styrene and butadiene by an emulsion- or solution-polymerization technique. The acrylonitrile-butadiene rubber (NBR) is a syntheitc rubber obtained mainly by the emulsion-copolymerization of acrylonitrile and butadiene. The polybutadiene rubber (BR) is a synthetic rubber obtained by solution-polymerization or emulsion-polymerization of butadiene in the presence of an organometallic compound as a catalyst. The acrylonitrile-isoprene (NIR) is a synthetic rubber having superior oil resistance obtained by copolymerizing acrylonitrile and isoprene. The alfin rubber is a synthetic rubber prepared by solution polymerzation using an alfin catalyst, and is classified into a styrene/butadiene copolymer and an isoprene/butadiene copolymer. The butadiene-methyl methacrylate rubber (MBR) is a synthetic rubber obtained by copolymerizing butadiene and methyl metacrylate opticnally with a third component such as a carboxylic acid. The polyisoprene rubber (IR) is a synthetic rubber having a similar chemical composition to natural rubber and obtained by polymerization of isoprene, and includes both the cis-type and the trans-type. The acrylonitrile/butadiene/isoprene rubber (NBIR) is a ternary copolymer rubber composed of acrylonitrile, butadiene and isoprene. The carboxylated acrylonitrile/butadiene rubber (CNBR) is a synthetic rubber composed of a ternay copolymer derived from butadiene, acrylonitrile and a small amount of an acidic monomer such as acrylic acid, methacrylic acid and maleic acid. The propylene oxide rubber (POR) and the propylene-butadiene rubber (PBR) are both relatively new rubbers. POR is a copolymer of propylene oxide and allyl glycidyl ether, and PBR is a blocked copolymer of propylene and butadiene having thermal stability and low permanent compression set. It is expected to be usable as a rubber having versatile applications. Natural rubber is a naturally occurring rubber composed of a polymer of isoprene, and includes both natural rubbers of the cis-type and natural rubbers of the trans-type (for example, gutta-percha and balata).

The various rubbers cited above can be used either in a solid or latex form as the rubber component of the composition of this invention. Furthermore, two or more of these rubbers may be used as a mixture in the desired mixing ratio. Of these rubbers, the styrene-butadiene rubber (SBR), acrylonitrile-butadiene rubber (NBR) and polybutadiene rubber (BR) are especially preferred.

The curing agent as a second component is either sulfur alone, a sulfur donor alone, or a mixture of sulfur and the sulfur donor. The sulfur donor denotes a substance which releases sulfur in the active stage at the vulcanization temperature, and therefore, can be used as a curing agent for rubbers.

The sulfur donor is known, and includes, for example, sulfur compounds such as sulfur monochloride, sulfur dichloride, morpholine disulfide, alkylphenol disulfides, N,N'-dithiobis(hexahydro-2H-azepinone-2), and phosphorus-containing polysulfides; thiazole compounds such as 2-(4'-morpholinodithio)benzothiazole; and thiuram polysulfide compounds such as teteramethylthiuram disulfide, activated tetrathiuram disulfide, tetraethylthiuram disulfide, tetrabutylthiuram disulfide, N,N'-dimethyl-N,N'-diphenylthiuram disulfide, depentamethylenethiuram disulfide, dipentamethylenethiuram tetrasulfide, dipentamethylenethiuram hexasulfide, dicyclopentamethylenethiuram disulfide, and mixed alkylthiuram disulfides.

A third component of the composition of this invention is at least one of the specified amino acids or their salts, and functions as a vulcanization accelerator. The salts are metal salts, preferably alkali metal salts, more preferably sodium salts.

Of the amino acids specified in the present invention, arginine, lysine, ornithine, and proline are particularly preferred.

The present inventor previously disclosed that certain amino acids have superior curing effects for brominated butyl rubber (Japanese Patent Application No. 124031/74), epichlorohydrin rubber (Japanese Patent Application No. 124032/74), polybutadiene rubber having bromine at the termini (Japanese Patent Application No. 11407/75), and chloroprene rubber (Japanese Patent Application No. 13329/75), and therefore, without conjointly using other known curing agents, curing agents composed only of the amino acids give fully satisfactory curing effects. In contrast, the amino acids specified in the present invention do not substantially show curing effects for the rubbers used in this invention, but exhibit superior vulcanization accelerating effects for sulfur and/or sulfur donor. This fact was discovered for the first time by the present inventor. In particular, the fact that the amino acids specified in the present invention exhibit superior vulcanization accelerating effect without the cojoint use of an activator such as zinc oxide is surprising and cannot be anticipated at all from the prior art. This discovery by the present inventor is unexpected also in view of the fact that as will be shown hereinbelow by a comparative experiment, 3,5-diiodotyrosine, an amino acid outside the scope of the invention, does not at all show a vulcanization accelerating effect despite its extreme similarity in chemical structure to tyrosine, an amino acid within the scope of the invention, and that as shown in Comparative Example 1 to be given hereinbelow, the amino acids specified in the present invention do not show any vulcanization accelerating effects for rubbers not specified in the present invention, for example, butyl rubbers or EPDM rubber.

Vulcanization of the composition of the present invention can be performed at the temperatures (e.g., 140° to 180° C.) and the pressures (e.g., 100 to 230 kg/cm$^2$) usually employed for the various rubbers specified in the present invention.

The content of the amino acid in the composition of this invention is 0.1 to 30 parts by weight, preferably 0.5 to 10 parts by weight, per 100 parts by weight of the total rubber content. The content of sulfur and/or a sulfur donor as the curing agent is 0.1 to 20 parts by weight, preferably 0.5 to 10 parts by weight, per part by weight of the total amino acid content.

It is possible to incorporate conventional compounding chemicals such as reinforcing agents, processing aids, pigments, softeners, plasticizers, and antioxidants in the curable composition of this invention. If desired, conventional vulcanization accelerators can also be used together.

The rubber compositions of this invention have utility in various applications in which ordinary rubbers find use. For example, they can be used as bicycle and motor vehicle tires, window frames, shoe soles, belts, hoses, printing rolls, and oil seals. Furthermore, since the amino acids used as vulcanization accelerators are non-toxic, and do not require activators such as zinc oxide which is hazardous to health, the compositions of this invention are conveniently used as nipples on nursing bottles, stoppers for articles associated with medical therapy and foodstuffs, pipes for milking machines, belts and hoses for foodstuff production or transportation, and liners for caps of beer and juice bottles.

The following Examples and Comparative Examples illustrate the present invention. In each of these examples, the numerical figures in the tables denote the parts by weight of the ingredients.

Rubber compounds were prepared by the methods stipulated in ASTM as shown below.
 ASTM D15-68a Part B 17: for NR and IR
 ASTM D15-68a Part B 19: for SBR, BR, PBR, MBR and POR
 ASTM D15-68a Part B 22: for NBR, NIR, NBIR, CNBR The vulcanization curves of the compounds were made using an oscillating disc rheometer (TSS type).

The tensile strength, elongation, and modulus of vulcanized rubbers were performed in accordance with JIS K-6301 using a Schopper type tensile tester at a pulling speed of 500 mm/min.

The measurement of hardness was performed in accordance with JIS K-6301 using a JIS-A type hardness tester.

EXAMPLE 1

Compounds containing SBR as a rubber component were prepared in accordance with the recipes shown in Table 1. The compounds were vulcanized under the conditions indicated using a steam press. The properties of the resulting vulcanized rubbers were as shown in Table 1.

Figure 1:
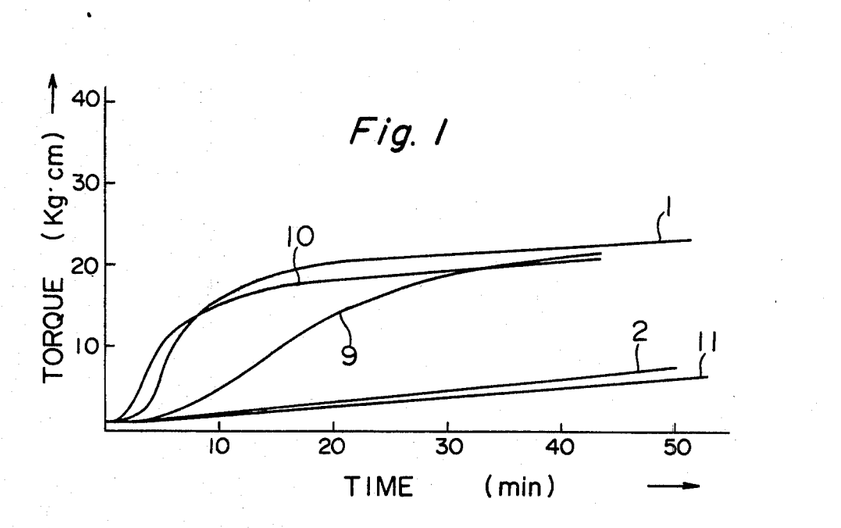
FIGS. 1 to 11 show the vulcanization curves of rubber compounds used in Examples.

The vulcanization curves obtained at 170° C. of compounds in Runs Nos. 1, 2, 9, 10 and 11 are shown in FIG. 1. The numerals attached to the curves correspond to the run numbers.

sulfur and the amino acids specified in this invention, the resulting vulcanized rubbers exhibit good properties. Vulcanization curve 1 in FIG. 1 clearly shows that the progress of vulcanization at this time was very satisfactory. In contrast, when vulcanization was performed using sulfur only, the resulting vulcanized rubbers had very poor properties (Runs Nos. 2 and 7), and the rate of vulcanization was very slow (see vulcanization curve 2 in FIG. 1). Run No. 11 and vulcanization curve 11 in FIG. 1 show that 3,5-diiodotyrosine, an amino acid not specified in the present invention, does not at all show a vulcanization accelerating effect. When vulcanization is performed using a mixture of sulfur and a vulcanization accelerator and an activator as is the case with the current commercial practice in the art (Run No. 10), the properties of the vulcanized rubber and the vulcanization curve 10 were both satisfactory. But when vulcanization was performed using sulfur and a vulcanization accelerator in the absence of an activator (Run No. 9), the rate of vulcanization became very slow as shown in vulcanization curve 9, and the method is not feasible commercially. The amino acids specified in the present invention are far superior to the conventional vulcanization accelerators because they exhibit superior vulcanization accelerating effect in the absence of activators.

EXAMPLE 2

Figure 2:
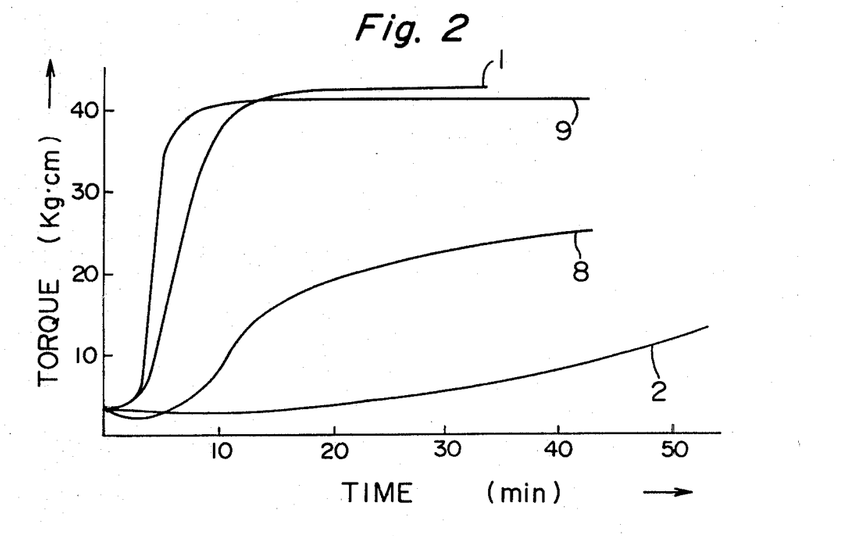

Using compounds of the recipes shown in Table 2 containing NBR as a rubber component, the same experiments as in Example 1 were performed. The physical properties of the resulting vulcanized rubbers are shown in Table 2. The vulcanization curves obtained at 160° C. of the compounds in Runs Nos. 1, 2, 8 and 9 are shown in FIG. 2. It is clear from Table 2 and FIG. 2

TABLE 1

| Run No. | 1 | 2 (comp.) | 3 | 4 | 5 | 6 | 7 (comp.) | 8 | 9 (comp.) | 10 (comp.) | 11 (comp.) |
|---|---|---|---|---|---|---|---|---|---|---|---|
| Styrene-butadiene rubber(SBR)[1] | 100 | 100 | 100 | 100 | 100 | 100 | 100 | 100 | 100 | 100 | 100 |
| SRF-L carbon black[2] | 40 | 40 | 40 | 40 | 40 | 40 | 40 | 40 | 40 | 40 | 40 |
| TE-58A[3] | 2.5 | 2.5 | 2.5 | 2.5 | 2.5 | — | — | — | — | — | 2.5 |
| Sulfur | 1 | 1 | 1 | 1 | 1 | 2 | 2 | 1 | 1 | 1 | 1 |
| 50% aqueous solution of lysine | 2.5 | — | — | 2.5 | — | — | — | 1.5 | — | — | — |
| 50% aqueous solution of ornithine | — | — | 2.5 | — | — | 3 | — | — | — | — | — |
| Arginine | — | — | — | 2.5 | — | — | — | 1.5 | — | — | — |
| Proline | — | — | — | — | 2.5 | — | — | — | — | — | — |
| 3,5-diiodotyrosine | — | — | — | — | — | — | — | — | — | — | 2.5 |
| DBTD[4] | — | — | — | — | — | — | — | — | 2 | 2 | — |
| ZnO | — | — | — | — | — | — | — | — | — | 5 | — |
| Stearic acid | — | — | — | — | — | — | — | — | — | 1 | — |
| Vulcanization temperature (°C.) | 160 | 160 | 160 | 160 | 170 | 160 | 160 | 160 | 160 | 160 | 160 |
| Vulcanization time (minutes) | 30 | 30 | 30 | 30 | 30 | 20 | 20 | 20 | 20 | 20 | 30 |
| 300% Modulus (kg/cm$^2$) | 50 | 6 | 43 | 51 | 58 | 63 | 4 | 53 | 34 | 22 | 5 |
| Tensile strength (kg/cm$^2$) | 153 | 13 | 158 | 173 | 195 | 211 | 6 | 192 | 165 | 153 | 8 |
| Elongation (%) | 670 | 1360 | 720 | 670 | 700 | 640 | 1360 | 860 | 860 | 940 | 1240 |
| Hardness | 55 | 40 | 52 | 55 | 52 | 56 | 38 | 38 | 49 | 44 | 36 |

Note
[1]JSR SBR 1502 ® made by Japan Synthetic Rubber Co., Ltd.
[2]Semi-reinforcing furnace low structure carbon black added as a reinforcing agent.
[3]An alkali metal salt of a higher fatty acid made by Technical Processing Company, U.S.A., added as a roll operation improver.
[4]Dibenzothiazyl disulfide as a conventional vulcanization accelerator.

It is clear from the experimental results shown in Table 1 that when SBR is vulcanized with a mixture of that with regard to NBR, the same experimental results as in the case of SBR are obtained.

TABLE 2

| Run No. | 1 | 2 (comp.) | 3 | 4 | 5 | 6 (comp.) | 7 | 8 (comp.) | 9 (comp.) |
|---|---|---|---|---|---|---|---|---|---|
| Acrylonitrile-butadiene rubber(NBR)[1] | 100 | 100 | 100 | 100 | 100 | 100 | 100 | 100 | 100 |
| SRF-L carbon black[2] | 40 | 40 | 40 | 40 | 40 | 40 | 40 | 40 | 40 |
| TE-58A[3] | 2.5 | 2.5 | 2.5 | 2.5 | — | — | — | — | — |
| Sulfur | 1 | 1 | 1 | 1 | 2 | 2 | 1 | 1 | 1 |
| 50% Aqueous solution of lysine | 2.5 | — | — | — | 3 | — | 3 | — | — |
| 50% Aqueous solution of ornithine | — | — | 2.5 | — | — | — | — | — | — |

TABLE 2-continued

| Run No. | 1 | 2 (comp.) | 3 | 4 | 5 | 6 (comp.) | 7 | 8 (comp.) | 9 (comp.) |
|---|---|---|---|---|---|---|---|---|---|
| Proline | — | — | — | 2.5 | — | — | — | — | — |
| DBTD[(4)] | — | — | — | — | — | — | — | 1.5 | 1.5 |
| ZnO | — | — | — | — | — | — | — | — | 5 |
| Stearic acid | — | — | — | — | — | — | — | — | 1 |
| Vulcanization temperature (°C.) | 160 | 160 | 160 | 170 | 160 | 160 | 160 | 160 | 160 |
| Vulcanization time (min.) | 30 | 30 | 30 | 25 | 20 | 20 | 20 | 20 | 20 |
| 300% Modulus (kg/cm²) | 70 | 25 | 66 | 48 | 112 | 13 | 53 | 48 | 93 |
| Tensile strength (kg/cm²) | 156 | 87 | 159 | 133 | 172 | 49 | 163 | 190 | 129 |
| Elongation (%) | 590 | 840 | 620 | 650 | 450 | 1120 | 760 | 790 | 410 |
| Hardness | 55 | 49 | 54 | 52 | 63 | 52 | 57 | 57 | 57 |

Note
[(1)]Polysar krynac 3450®, NBR made by Polysar Ltd.
[(2)], [(3)] and [(4)]: same as in Example 1

EXAMPLE 3

Figure 3:
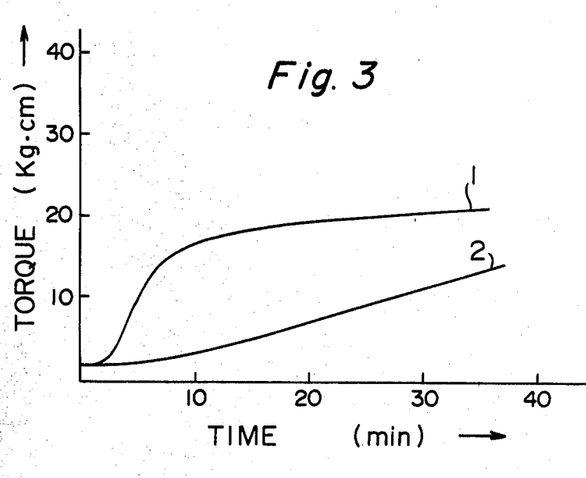

Using compounds of the recipes shown in Table 3 containing BR, the same experiments as in Example 1 were performed. The properties of the resulting vulcanized rubbers are shown in Table 3. The vulcanization curves obtained at 170° C. of the compounds in Runs Nos. 1 and 2 are shown in FIG. 3. When vulcanization was performed using sulfur and a conventional vulcanization accelerator without an activator (Run No. 7), a phenomenon of blooming (whitening of the surface of rubber) occurred conspicuously, and such a vulcanization system cannot at all be adopted for commercial operation. In contrast, vulcanization proceeded smoothly when using a mixture of sulfur and the amino acids specified in the present invention, and no blooming phenomenon occurred.

TABLE 3

| Run No. | 1 | 2 (comp.) | 3 | 4 | 5 (comp.) | 6 | 7 (comp.) | 8 (comp.) |
|---|---|---|---|---|---|---|---|---|
| Polybutadiene rubber (BR)[(1)] | 100 | 100 | 100 | 100 | 100 | 100 | 100 | 100 |
| SRF-L carbon black[(2)] | 40 | 40 | 40 | 40 | 40 | 40 | 40 | 40 |
| TE-58A[(3)] | 2.5 | 2.5 | 2.5 | — | — | — | — | — |
| Sulfur | 1 | 1 | 1 | 2 | 2 | 1 | 1 | 1 |
| 50% Aqueous solution of lysine | 2.5 | — | — | — | — | 1.5 | — | — |
| Arginine | 2.5 | — | — | — | — | 1.5 | — | — |
| Proline | — | — | 2.5 | — | — | — | — | — |
| 50% Aqueous solution of ornithine | — | — | — | 3 | — | — | — | — |
| DBTD[(4)] | — | — | — | — | — | — | 1.5 | 1.5 |
| TMTD[(5)] | — | — | — | — | — | — | 0.2 | 0.2 |
| ZnO | — | — | — | — | — | — | — | 5 |
| Stearic acid | — | — | — | — | — | — | — | 1 |
| Vulcanization temperature (°C.) | 160 | 160 | 170 | 160 | 160 | 160 | 160 | |
| Vulcanization time (minutes) | 30 | 30 | 30 | 20 | 20 | 20 | 20 | 20 |
| 300% Modulus (kg/cm²) | 25 | 6 | 46 | 44 | 2 | 22 | 30 | 22 |
| Tensile strength (kg/cm²) | 100 | 25 | 141 | 157 | 6 | 81 | 120 | 81 |
| Elongation (%) | 690 | 750 | 650 | 750 | 1180 | 640 | 670 | 640 |
| Hardness | 42 | 24 | 47 | 47 | 22 | 37 | 47 | 37 |

Note
[(1)]JSR BR01®, made by Japan Synthetic Rubber Co., Ltd.
[(2)],[(3)],[(4)]Same as in Example 1
[(5)]Tetramethylthiuram disulfide as a conventional vulcanization accelerator.

EXAMPLE 4

Figure 4:
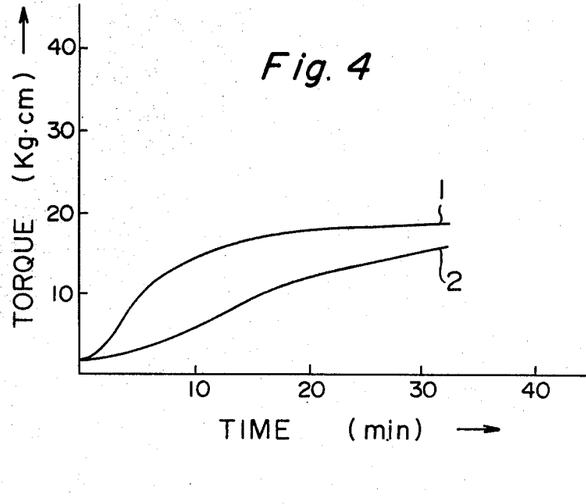

Using compounds of the recipes shown in Table 4 containing alfine rubber (AR) as a rubber component, the same experiments as in Example 1 were performed. The properties of the vulcanized rubbers obtained are shown in Table 4. The vulcanization curves obtained at 170° C. of the compounds in Runs Nos. 1 and 2 are shown in Table 4. In the compound of Run No. 4 in which 3,5-diiodotyrosine was used, foaming occurred, and no vulcanization could be effected. Hence, its physical properties were not determined.

TABLE 4

| Run No. | 1 | 2 (comp.) | 3 | 4 (comp.) |
|---|---|---|---|---|
| Alfin rubber (AR)[(1)] | 100 | 100 | 100 | 100 |
| SRF-L carbon black[(2)] | 40 | 40 | 40 | 40 |
| Sulfur | 2 | 2 | 2 | 2 |
| 50% Aqueous solution of lysine | 3 | — | 1.5 | — |
| Arginine | — | — | 1.5 | — |
| 3,5-diiodotyrosine | — | — | — | 3 |
| Vulcanization temperature (°C.) | 160 | 160 | 160 | 160 |
| Vulcanization time (minutes) | 20 | 20 | 20 | 20 |
| 300% Modulus (kg/cm²) | 45 | 4 | 43 | — |
| Tensile strength (kg/cm²) | 170 | 7 | 134 | — |
| Elongation (%) | 730 | 2800 | 690 | — |
| Hardness | 44 | 34 | 44 | — |

Note
[(1)]JSR AL 3778® (styrene/butadiene type) made by Japan Synthetic Rubber Co., Ltd.
[(2)]Same as in Example 1.

EXAMPLE 5

Figure 5:
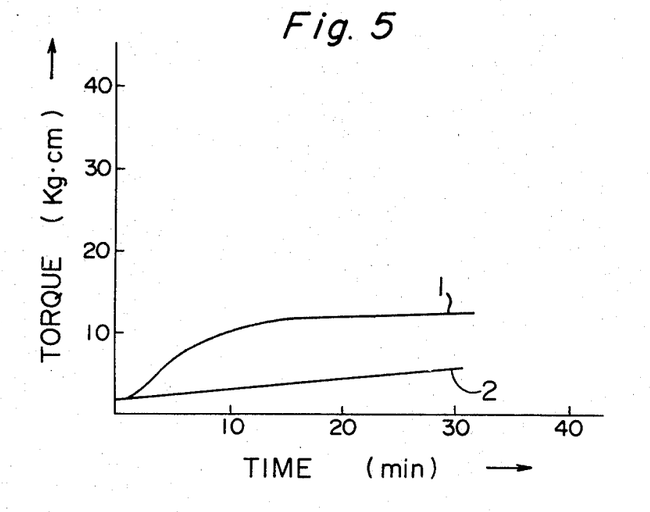

Using compounds having the same recipes as shown in Table 5 below containing acrylonitrile-isoprene rubber (NIR) as a rubber component, the same experiments as in Example 1 were performed. The physical properties of the vulcanized rubbers are shown in Table 5. The vulcanization curves of the compounds are shown in FIG. 5.

TABLE 5

| Run No. | 1 | 2 (comp.) |
|---|---|---|
| Acrilonitrile-isoprene rubber (NIR)[1] | 100 | 100 |
| SRF-L carbon black[2] | 40 | 40 |
| TE-58A[3] | 2.5 | 2.5 |
| Sulfur | 1 | 1 |
| 50% Aqueous solution of lysine | 2.5 | — |
| Vulcanization temperature (°C.) | 170 | 170 |
| Vulcanization time (minutes) | 20 | 20 |
| 300% Modulus (kg/cm$^2$) | 46 | 31 |
| Tensile strength (kg/cm$^2$) | 120 | 87 |
| Elongation (%) | 830 | 900 |
| Hardness | 60 | 58 |

Note
[1] Polysar Krynac 833®, an acrylonitrile/isoprene rubber made by Polysar Ltd.
[2] and [3] Same as in Example 1.

EXAMPLE 6

This Example shows that amino acids specified in the present invention except those already used in Examples 1 to 5 are superior vulcanization accelerators not requiring the conjoint use of activators in the sulfur vulcanization of NBR.

The compound used was prepared in accordance with the recipe shown in Table 6A, and the amino acids used are shown in Table 6B. Vulcanization was performed using an electrically heated press at 170° C. for 30 minutes. The properties of the vulcanized rubbers are shown in Table 6B.

TABLE 6A

| Acrylonitrile-butadiene rubber (NBR)[1] | 100 |
|---|---|
| SRF-L carbon black[2] | 40 |
| Sulfur | 1 |
| TE-58A[3] | 2.5 |
| Amino acid | 2.5 |

Note:
[1],[2] and [3] are the same as in Example 1.

TABLE 6B

| Run No. | Amino acids | 300% Modulus (kg/cm$^2$) | Tensile Strength (kg/cm$^2$) | Elongation (%) | Hardness |
|---|---|---|---|---|---|
| 1 | Isoleucine | 60 | 163 | 700 | 53 |
| 2 | Histidine | 54 | 151 | 650 | 44 |
| 3 | Hydroxyproline | 52 | 147 | 650 | 54 |
| 4 | Tryptophan | 48 | 163 | 730 | 44 |
| 5 | Threonine | 55 | 143 | 620 | 54 |
| 6 | Serine | 48 | 143 | 690 | 54 |
| 7 | Valine | 52 | 155 | 670 | 53 |
| 8 | Methionine | 42 | 134 | 740 | 53 |
| 9 | Tyrosine | 54 | 155 | 650 | 55 |
| 10 | Alanine | 53 | 136 | 630 | 55 |
| 11 | Aspartic acid | 44 | 133 | 690 | 53 |
| 12 | Citrulline | 58 | 146 | 620 | 54 |
| 13 | Glutamine | 50 | 153 | 710 | 53 |
| 14 | Sodium glutamate | 54 | 162 | 680 | 53 |
| 15 | Homoserine | 41 | 195 | 870 | 53 |
| 16 | None | 21 | 115 | 1040 | 51 |

EXAMPLE 7

Compounds of the recipes shown in Table 7 containing SBR were vulcanized using a sulfur donor as a curing agent at 160° C. for 20 minutes. The properties of the resulting vulcanized rubbers are shown in Table 7.

TABLE 7

| Run No. | 1 | 2 (comp.) | 3 (comp.) |
|---|---|---|---|
| Styrene-butadiene rubber(SBR)[1] | 100 | 100 | 100 |
| SRF-L carbon black[2] | 40 | 40 | 40 |
| TETS[3] | 3 | 3 | 3 |
| 50% Aqueous solution of lysine | 6 | — | — |
| ZnO | — | — | 5 |
| Stearic acid | — | — | 1 |
| 300% Modulus (kg/cm$^2$) | 38 | 4 | 44 |
| Tensile strength (kg/cm$^2$) | 155 | 5 | 187 |
| Elongation (%) | 850 | 1520 | 750 |
| Hardness | 53 | 40 | 53 |

Note
[1] and [2] are the same as in Example 1.
[3] Tetraethylthiuram disulfide as the sulfur-donor.

As can be seen from the experimental results shown above, even when vulcanization is carried out using only a sulfur-donor, the resulting rubber has very poor properties. However, when an amino acid is used conjointly, the result obtained is equivalent to that obtained when ZnO and stearic acid are used conjointly as in the conventional practice. Accordingly, the hazardous ZnO can be replaced by non-toxic amino acids.

EXAMPLE 8

Figure 6:
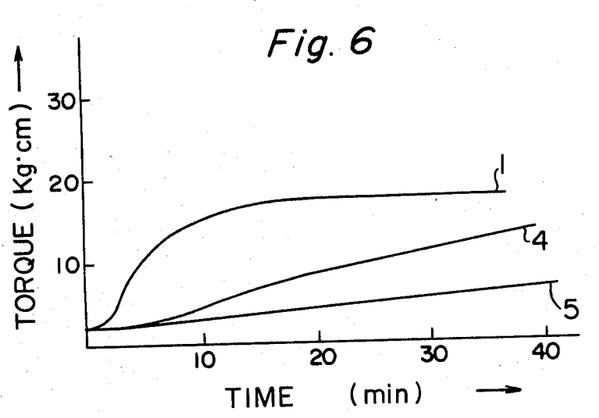

Using compounds of the recipes shown in Table 8 containing natural rubber (NR), the same experiments as in Example 1 were performed. The properties of the vulcanized rubbers obtained are shown in Table 8. The vulcanization curves obtained at 160° C. of the compounds in Runs Nos. 1, 4 and 5 are shown in FIG. 6. It can be seen from FIG. 6 that the compound in Run No. 4 was slow in vulcanization. When the vulcanized rubbers in Run No. 4 was allowed to stand for 1 to 2 days, considerable blooming occurred, and vulcanization using sulfur alone in the absence of activators and accelerators was quite infeasible commercially. In contrast, vulcanization using a mixture of sulfur and the specified amino acids (Runs Nos. 1 to 3) could be performed smoothly in the absence of activators such as zinc oxide. The modulus and tensile strength of the resulting vulcanized rubbers showed a great improvement, and no blooming occurred.

In Run No. 5 in which sulfur was used together with 3,5-diiodotyrosine which was not within the amino acids specified in the present invention, the rate of vulcanization decreased to a greater extent than in the case of using sulfur alone, and the properties of the vulcanized rubber were deteriorated. This is clearly shown by the experimental results shown in Table 8 and the vulcanization curves shown in FIG. 6. Furthermore, the vulcanized rubber obtained in Run No. 5 underwent blooming same as the vulcanized rubber in Run No. 4.

TABLE 8

| Run No. | 1 | 2 | 3 | 4 (comp.) | 5 (comp.) |
|---|---|---|---|---|---|
| Natural rubber (RSS1) | 100 | 100 | 100 | 100 | 100 |
| SRF-L, carbon black[1] | 40 | 40 | 40 | 40 | 40 |
| Sulfur | 3 | 3 | 3 | 3 | 3 |
| 50% Aqueous solution of lysine | 1.57 | 2.70 | 1.45 | — | — |
| Histidine | 3.43 | — | — | — | — |
| Tyrosine | — | 0.20 | — | — | — |
| Glutamic acid | — | 3.30 | 1.78 | — | — |
| Arginine | — | — | 1.78 | — | — |
| 3,5-diiodotyrosine | — | — | — | — | 2.5 |

TABLE 8-continued

| Run No. | 1 | 2 | 3 | 4 (comp.) | 5 (comp.) |
|---|---|---|---|---|---|
| Vulcanization temperature (°C.) | 160 | 160 | 160 | 160 | 160 |
| Vulcanization time (minutes) | 30 | 30 | 30 | 30 | 30 |
| 300% Modulus (kg/cm$^2$) | 33 | 33 | 34 | 28 | 12 |
| Tensile strength (kg/cm$^2$) | 162 | 147 | 178 | 128 | 68 |
| Elongation (%) | 680 | 650 | 690 | 640 | 610 |
| Hardness | 42 | 40 | 42 | 36 | 27 |

Note:
(1) is the same as (2) in Example 1.

EXAMPLE 9

Figure 7:
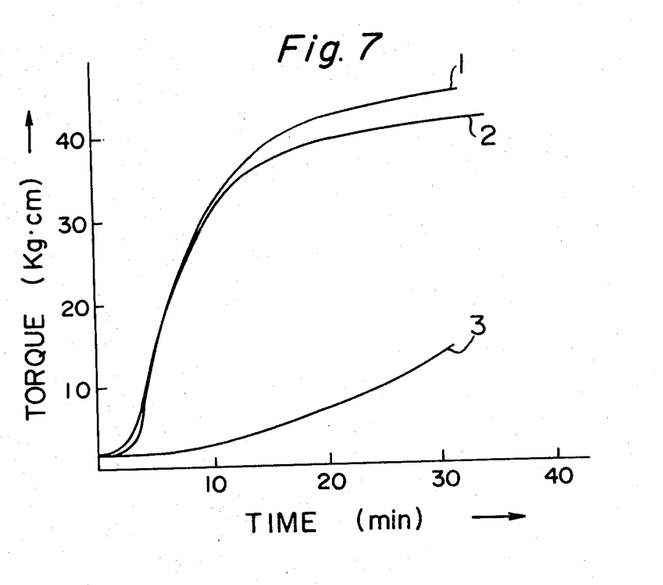

Using compounds of the recipes shown in Table 9 containing acrylonitrile-butadiene-isoprene rubber (NBIR) as a rubber component, the same experiments as in Example 1 were performed. The properties of the vulcanized rubbers obtained are shown in Table 9, and the vulcanization curves obtained at 160° C. of the compounds in Runs Nos. 1, 2 and 3 are shown in FIG. 7. It is clear from the results obtained that the same results are obtained with regard to NBIR as in the case of SBR in Example 1.

TABLE 9

| Run No. | 1 | 2 | 3 (comp.) |
|---|---|---|---|
| Acrylonitrile-butadiene-isoprene rubber (NBIR)$^{(1)}$ | 100 | 100 | 100 |
| SRF-L carbon black$^{(2)}$ | 40 | 40 | 40 |
| Sulfur | 2 | 2 | 2 |
| 50% Aqueous solution of lysine | 3 | — | — |
| 50% Aqueous solution of ornithine | — | 3 | — |
| Vulcanization temperature (°C.) | 160 | 160 | 160 |
| Vulcanization time (minutes) | 20 | 20 | 20 |
| 300% Modulus (kg/cm$^2$) | 155 | 153 | 23 |
| Tensile strength (kg/cm$^2$) | 155 | 208 | 80 |
| Elongation (%) | 300 | 430 | 970 |
| Hardness | 67 | 65 | 56 |

Note
$^{(1)}$Nipol DN-1201 ®, a product of Nippon Zeon Co., Ltd.
$^{(2)}$Same as in Example 1.

EXAMPLE 10

Figure 8:
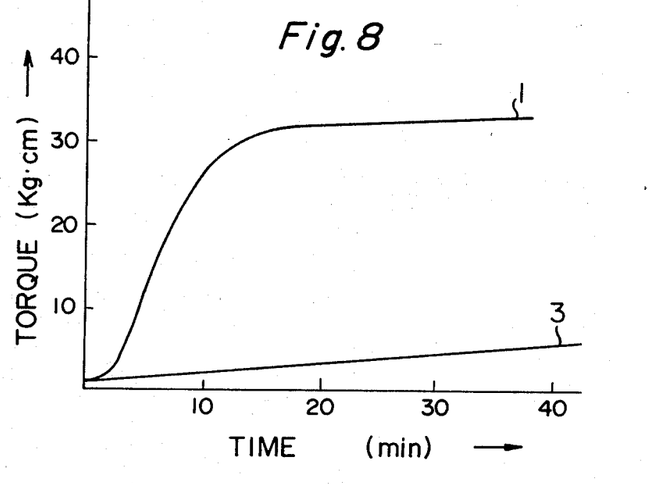

Using compounds of the recipes shown in Table 10 containing a carboxylated acrylonitrile-butadiene rubber (CNBR) as a rubber component, the same experiments as in Example 1 were performed. The properties of the vulcanized rubbers obtained are shown in Table 10, and the vulcanization curves obtained at 160° C. of the compounds in Runs Nos. 1 and 3 are shown in FIG. 8.

TABLE 10

| | 1 | 2 | 3 (comp.) |
|---|---|---|---|
| Carboxylated acrylonitrile-butadiene rubber (CNBR)$^{(1)}$ | 100 | 100 | 100 |
| SRF-L carbon black$^{(2)}$ | 40 | 40 | 40 |
| Sulfur | 2 | 2 | 2 |
| TE-58A$^{(3)}$ | 2.5 | 2.5 | 2.5 |
| 50% Aqueous solution of lysine | 2.5 | 2.1 | — |
| Arginine | 2.5 | — | — |
| Threonine | — | 2.9 | — |
| Vulcanization temperature (°C.) | 160 | 160 | 160 |
| Vulcanization time (minutes) | 20 | 20 | 20 |
| 300% Modulus (kg/cm$^2$) | 132 | 99 | 10 |
| Tensile strength (kg/cm$^2$) | 220 | 199 | 27 |
| Elongation (%) | 490 | 540 | 1790 |
| Hardness | 66 | 60 | 51 |

Note
$^{(1)}$Nipol 1072 ®, a product of Nippon Zeon Co., Ltd.
$^{(2)}$and $^{(3)}$are the same as in Example 1.

EXAMPLE 11

Figure 9:
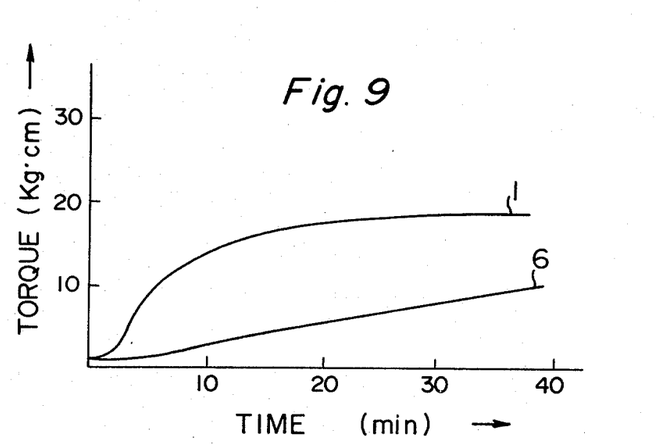

Using compounds of the recipes shown in Table 11 containing polysiprene rubber (IR) as a rubber component, the same experiments as in Example 1 were performed. The properties of the resulting vulcanized rubbers are shown in Table 11, and the vulcanization curves obtained at 160° C. of the compounds in Runs Nos. 1 and 6 are shown in FIG. 9.

TABLE 11

| Run No. | 1 | 2 | 3 | 4 | 5 | 6 (comp.) |
|---|---|---|---|---|---|---|
| Polyisoprene rubber (IR)$^{(1)}$ | 100 | 100 | 100 | 100 | 100 | 100 |
| SRF-L carbon black$^{(2)}$ | 40 | 40 | 40 | 40 | 40 | 40 |
| Sulfur | 3 | 3 | 3 | 3 | 3 | 3 |
| TE-58A$^{(3)}$ | 1 | 1 | 1 | 1 | 1 | 1 |
| 50% Aqueous solution of lysine | 2.1 | 2.1 | 2.1 | 2.1 | 1.6 | — |
| Isoleucine | 2.9 | — | — | — | — | — |
| Tryptophane | — | 2.9 | — | — | — | — |
| Leucine | — | — | 2.9 | — | — | — |
| Glutamine | — | — | — | 2.9 | — | — |
| Glutamic acid | — | — | — | — | 1.7 | — |
| Arginine | — | — | — | — | 1.7 | — |
| Vulcanization temperature (°C.) | 160 | 160 | 160 | 160 | 160 | 160 |
| Vulcanization time (minutes) | 20 | 20 | 20 | 20 | 20 | 20 |
| 300% Modulus (kg/cm$^2$) | 29 | 21 | 27 | 21 | 19 | 13 |
| Tensile strength (kg/cm$^2$) | 173 | 160 | 161 | 157 | 154 | 80 |
| Elongation (%) | 760 | 830 | 750 | 790 | 810 | 740 |
| Hardness | 40 | 40 | 40 | 38 | 36 | 28 |

Note
$^{(1)}$Kuraprene IR-10 ® made by Kuraray Co., Ltd.
$^{(2)}$ and $^{(3)}$ are the same as in Example 1.

EXAMPLE 12

Using compounds of the recipes shown in Table 12 containing a butadiene-methyl metahcrylate rubber (MBR) as a rubber component, the same experiments as in Example 1 were carried out. The properties of the resulting vulcanized rubbers are shown in Table 12.

TABLE 12

| Run No. | 1 | 2 | 3 (comp.) |
|---|---|---|---|
| Methyl methacrylate-butadiene rubber (MBR)$^{(1)}$ | 100 | 100 | 100 |
| SRF-L carbon black$^{(2)}$ | 40 | 40 | 40 |
| Sulfur | 2 | 2 | 2 |
| TE-58A$^{(3)}$ | 2.5 | 2.5 | 2.5 |
| 50% Aqueous solution of ornithine | 2.5 | — | — |
| Methionine | — | 2.5 | — |
| Vulcanization temperature (°C.) | 160 | 160 | 160 |

TABLE 12-continued

| Run No. | 1 | 2 | 3 (comp.) |
|---|---|---|---|
| Vulcanization time (minutes) | 20 | 20 | 20 |
| 300% Modulus (kg/cm$^2$) | 149 | 139 | 125 |
| Tensile strength (kg/cm$^2$) | 198 | 194 | 167 |
| Elongation (%) | 390 | 460 | 450 |
| Hardness | 67 | 70 | 67 |

Note
[1] A solid rubber obtained by fully drying at room temperature Croslene 2M-36® (a latex of methyl methacrylate-butadiene rubber with a total solids content of 40%), a product of Takeda Chemical Co., Ltd.
[2] and [3] are the same as in Example 1.

EXAMPLE 13

Figure 10:
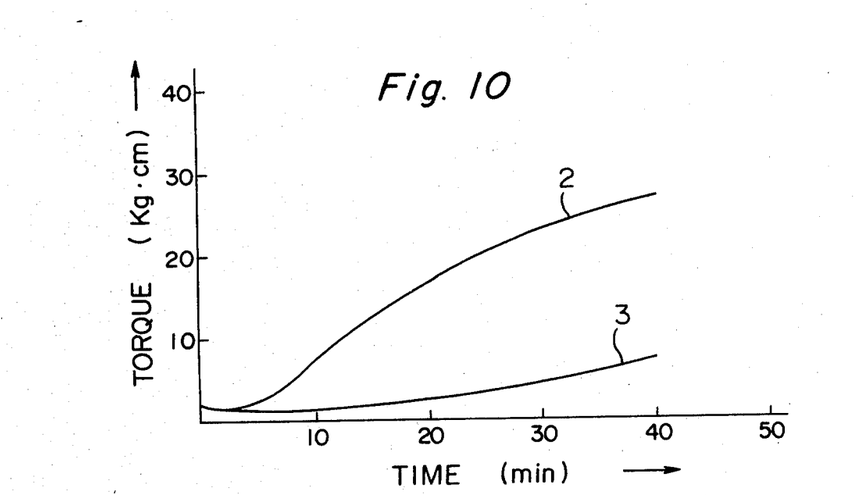

Using compounds of the recipes shown in Table 13 containing POR as a rubber component, the same experiments as in Example 1 were performed. The properties of the resulting vulcanized rubbers are shown in Table 13, and the vulcanization curves obtained at 160° C. of the compounds in Runs Nos. 2 and 3 are shown in FIG. 10.

TABLE 13

| Run No. | 1 | 2 | 3 (comp.) |
|---|---|---|---|
| Propylene oxide (POR)[1] | 100 | 100 | 100 |
| SRF-L carbon black[2] | 40 | 40 | 40 |
| Sulfur | 1.5 | 1.5 | 1.5 |
| 50% Aqueous solution of lysine | 3 | — | — |
| 50% Aqueous solution or ornithine | — | 3 | — |
| Vulcanization temperature (°C.) | 160 | 160 | 160 |
| Vulcanization time (minutes) | 30 | 30 | 30 |
| 300% Modulus (kg/cm$^2$) | 50 | 43 | 4 |
| Tensile strength (kg/cm$^2$) | 24 | 71 | 5 |
| Elongation (%) | 420 | 500 | 1080 |
| Hardness | 48 | 46 | 28 |

Note
[1] Parel 58®, 1 propylene oxide rubber made by Hercules Powder Co., Inc., U.S.A.
[2] is the same as in Example 1.

EXAMPLE 14

Rubber compounds were prepared in accordance with the recipes shown in Table 14A, and vulcanized under the conditions shown in Table 14A using the amino acids shown in Table 14B which were not used in Example 13. The properties of the vulcanized rubbers are shown in Table 14B.

TABLE 14A

| Run No. | 1-11 | 12 |
|---|---|---|
| Propylene oxide rubber[1] | 100 | 100 |
| SRF-L carbon black[2] | 40 | 40 |
| Sulfur | 1.5 | 1.5 |
| TE-58A[3] | 2.5 | 2.5 |
| Amino acid (shown in Table 14B) | 2.5 | — |
| Vulcanization temperature (°C.) | 160 | 160 |
| Vulcanization time (minutes) | 30 | 30 |

Note
[1] Same as in Example 13.
[2] and [3] Same as in Example 1.

TABLE 14B

| Run No. | Amino acid | 300% modulus (kg/cm$^2$) | Tensile strength (kg/cm$^2$) | Elongation (%) | Hardness |
|---|---|---|---|---|---|
| 1 | Leucine | 20 | 120 | 1240 | 36 |
| 2 | Proline | 47 | 72 | 470 | 48 |
| 3 | Arginine | 35 | 76 | 580 | 44 |
| 4 | Glutamine | 14 | 74 | 1240 | 34 |
| 5 | Tyrosine | 14 | 111 | 1380 | 38 |
| 6 | Valine | 16 | 100 | 1250 | 36 |
| 7 | Isoleucine | 11 | 69 | 1240 | 32 |
| 8 | Methionine | 25 | 90 | 820 | 41 |
| 9 | Phenylalamine | 27 | 99 | 910 | 40 |
| 10 | Homoserine | 29 | 88 | 840 | 42 |
| 11 (comp.) | 3,5-diiodo-tyrosine | 6 | 18 | 1170 | 28 |
| 12 (comp.) | None | 4 | 8 | 1110 | 28 |

EXAMPLE 15

Figure 11:
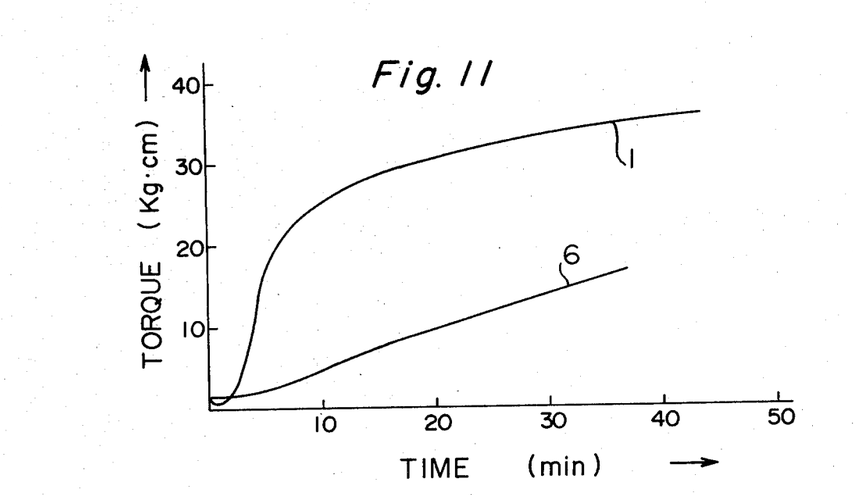

Using compounds of the recipes shown in Table 15 containing PBR as a rubber component, the same experiments as in Example 1 were performed. The properties of the vulcanized rubbers are shown in Table 15. The vulcanization curves obtained at 160° C. of the compounds in Runs Nos. 1 and 6 (comparisons) are shown in FIG. 11.

TABLE 15

| Run No. | 1 | 2 | 3 | 4 | 5 | 6 (comp.) |
|---|---|---|---|---|---|---|
| Propylene butadiene rubber[1] | 100 | 100 | 100 | 100 | 100 | 100 |
| SRF-L carbon black[2] | 40 | 40 | 40 | 40 | 40 | 40 |
| Sulfur | 1.5 | 1.5 | 1.5 | 1.5 | 1.5 | 1.5 |
| 50% Aqueous solution of ornithine | 3 | — | 2 | — | 2.1 | — |
| 50% Aqueous solution of lysine | — | 3 | — | — | — | — |
| Arginine | — | — | 2 | — | — | — |
| Glutamine paste[3] | — | — | — | 4 | — | — |
| Histidine | — | — | — | — | 0.9 | — |
| Vulcanization temperature (°C.) | 160 | 160 | 160 | 160 | 160 | 160 |
| Vulcanization time (minutes) | 30 | 30 | 30 | 30 | 30 | 30 |
| 300% Modulus (kg/cm$^2$) | 60 | 61 | 52 | 18 | 68 | 10 |
| Tensile strength (kg/cm$^2$) | 116 | 149 | 146 | 160 | 142 | 102 |
| Elongation (%) | 490 | 540 | 580 | 1110 | 500 | 1410 |
| Hardness | 58 | 58 | 57 | 50 | 58 | 48 |

Note
[1] A propylene-butadiene blocked copolymer made by Maruzen Petrochemical Co., Ltd.
[2] Same as in Example 1.
[3] Glutamine containing 25% of water

COMPARATIVE EXAMPLE 1

This Comparative Example shows that the amino acids specified in the present invention do not at all show vulcanization accelerating effects for rubbers other than those specified in the present invention.

Compounds of the recipes shown in Table 16 containing either a butyl rubber or an EPDM rubber as a rubber component were prepared in accordance with the method described in ASTM D15-68a, Part B 21, and then heated at 170° C. for 30 minutes. It was found that while a vulcanized rubber of good quality was obtained with a vulcanization system in Run No. 6 which is usually employed in commercial operations, mixtures of sulfur and the amino acids did not induce vulcanization.

TABLE 16

| Run No. | 1 | 2 | 3 | 4 | 5 | 6 |
|---|---|---|---|---|---|---|
| Butyl rubber[1] | 100 | 100 | — | — | — | — |
| EPDM rubber[2] | — | — | 100 | 100 | 100 | 100 |
| SRF-L carbon black[3] | 40 | 40 | 40 | 40 | 40 | 40 |
| TE-58A[4] | 2.5 | 2.5 | 5 | 5 | 5 | 5 |
| Sulfur | 1 | 1 | 1 | 1 | 1 | 1 |
| 50% Aqueous solution of lysine | 2.5 | — | 5 | — | 5 | — |
| 50% Aqueous solution of ornithine | — | 2.5 | — | 5 | — | — |
| Arginine | — | — | — | — | 5 | — |
| ZnO | — | — | — | — | — | 5 |
| Stearic acid | — | — | — | — | — | 1 |
| 300% Modulus (kg/cm²) | Since no vulcanization occurred, these properties were not measured | | | | | 42 |
| Tensile strength (kg/cm²) | | | | | | 193 |
| Elongation (%) | | | | | | 660 |
| Hardness | | | | | | 53 |

Note
[1] Polysar Butyl 402 ®, a butyl rubber of Polysar Ltd.
[2] Mitsui EPT 4045 ®, a product of Mitsui Petrochemical Co., Ltd.
[3] and [4] were the same as [2] and [3] respectively in Example 1.

What we claim is:

1. A curable composition consisting of (A) at least one rubber selected from the group consisting of a styrene-butadiene rubber, an acrylonitrile-butadiene rubber, a polybutadiene rubber, an acrylonitrile-isoprene rubber, an alfin rubber, a butadiene-methyl methacrylate rubber, a polyisoprene rubber, an acrylonitrile-butadieneisoprene rubber, a carboxylated acrylonitrile-butadiene rubber, a propylene oxide rubber, a propylene-butadiene rubber, and natural rubber, (B) at least one curing agent selected from the group consisting of sulfur and sulfur donors, and (C) at least one compound, as a vulcanization accelerator not requiring an activator, selected from the group consisting of arginine, lysine, hydroxylysine, ornithine, proline, hydroxyproline, leucine, isoleucine, histidine, tryptophan, threonine, serine, homoserine, alanine, phenylalanine, valine, methionine, citrulline, tyrosine, asparagine, aspartic acid, glutamine, glutamic acid, and salts of these amino acids.

2. The composition of claim 1 wherein the compound as a vulcanization accelerator is at least one member selected from the group consisting of arginine, lysine, ornithine, proline and salts of these amino acids.

3. The composition of claim 1 wherein the rubber is selected from the group consisting of a styrene-butadiene rubber, an acrylonitrile-butadiene rubber and a polybutadiene rubber.

4. The composition of claim 1 wherein the amount of the compound (C) is 0.1 to 30 parts by weight per 100 parts by weight of the rubber, and the amount of the curing agent is 0.1 to 20 parts by weight per part by weight of the compound (C).

* * * * *